United States Patent
England et al.

(10) Patent No.: US 7,300,189 B2
(45) Date of Patent: Nov. 27, 2007

(54) INTERCHANGEABLE FLASHLIGHT-CARGO LAMP SYSTEM

(75) Inventors: Ricky England, Sparta, TN (US); Alex Altgilbers, Sparta, TN (US); Philip Hall, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 171 days.

(21) Appl. No.: 11/169,031

(22) Filed: Jun. 28, 2005

(65) Prior Publication Data

US 2006/0291224 A1 Dec. 28, 2006

(51) Int. Cl.
*B60Q 1/00* (2006.01)
*B60Q 3/00* (2006.01)

(52) U.S. Cl. ............... 362/486; 362/490; 362/486; 362/200; 362/183

(58) Field of Classification Search ........... 362/490, 362/486, 488, 200, 183
See application file for complete search history.

(56) References Cited

U.S. PATENT DOCUMENTS

| | | | |
|---|---|---|---|
| 4,819,134 A | 4/1989 | Rossi | 362/61 |
| 5,077,643 A | 12/1991 | Leach | 362/183 |
| 5,091,831 A | 2/1992 | Van Order et al. | 362/74 |
| 5,645,340 A | 7/1997 | Colton | 362/80 |
| 5,808,373 A * | 9/1998 | Hamanishi et al. | 307/10.1 |
| 5,908,233 A | 6/1999 | Heskett et al. | 362/183 |
| 5,984,495 A | 11/1999 | Roberts et al. | 362/490 |
| 6,022,131 A | 2/2000 | Morimoto et al. | 362/549 |
| 6,056,423 A | 5/2000 | Takano et al. | 362/488 |
| 6,079,858 A | 6/2000 | Hicks | 362/486 |
| 6,176,536 B1 * | 1/2001 | Miller et al. | 296/37.7 |
| 6,206,553 B1 | 3/2001 | Boddy et al. | 362/494 |
| 6,231,219 B1 * | 5/2001 | Lohss et al. | 362/486 |
| 6,398,394 B1 * | 6/2002 | Winnik | 362/490 |
| 6,746,140 B2 * | 6/2004 | Ichikawa et al. | 362/494 |
| 6,902,284 B2 * | 6/2005 | Hutzel et al. | 359/865 |
| 7,097,225 B2 * | 8/2006 | Huisingh et al. | 296/37.7 |

* cited by examiner

*Primary Examiner*—Jong-Suk (James) Lee
*Assistant Examiner*—Jacob Y Choi
(74) *Attorney, Agent, or Firm*—Robert L. Stearns; Dickinson Wright PLLC

(57) ABSTRACT

An interchangeable flashlight-cargo lamp system includes a docking station that is suitable for mounting either a cargo lamp or a rechargeable flashlight. The flashlight doubles as a cargo lamp when mounted within the docking station. Both the cargo lamp and the flashlight have common mounting elements that mate with corresponding mounting features of the docking station to permit either device to be inserted into and removed from the docking station. The interchangeable devices also include electrical contacts that mate with corresponding electrical contacts in the docking station. The flashlight further includes a battery that is recharged when the flashlight is mounted in the docking station.

1 Claim, 3 Drawing Sheets

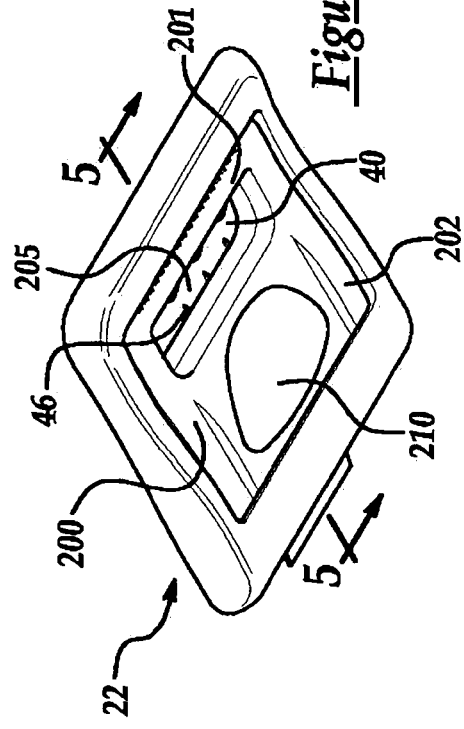
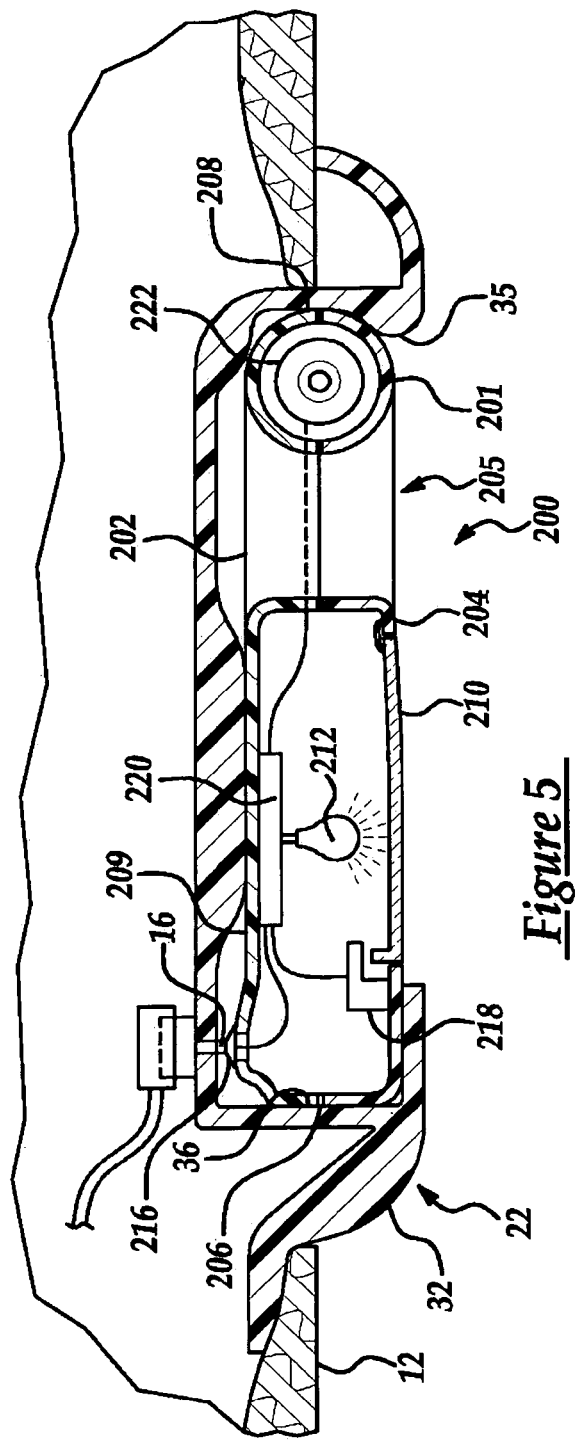

INTERCHANGEABLE FLASHLIGHT-CARGO LAMP SYSTEM

FIELD OF THE INVENTION

The present invention relates generally to automotive lighting systems and, in particular, to vehicle cargo lamps.

BACKGROUND OF THE INVENTION

Cargo lamps are commonly used as a light source for illuminating the interior passenger compartment of a vehicle. Typically, a passenger vehicle will include at least one cargo lamp in the form of a dome lamp centrally located in the headliner between the first and second rows of seats. For vans and vehicles having a third row of seating, a second cargo lamp is often provided in the headliner at the rear of the vehicle. Sometimes additional lighting is desirable beyond the fixed OEM lighting sources normally included with a vehicle. For this reason, people often equip their vehicle with a flashlight or other mobile light source that is usually stored in the glove box. This provides a mobile light source that can be used inside or outside of the vehicle.

Ordinary flashlights stored in a vehicle for occasional use do, however, have their drawbacks. First, flashlights kept in the vehicle are normally only infrequently used and, because they typically run from batteries, it is not uncommon for the user to find that the batteries are dead when attempting to use the flashlight after many months of being stored unused in the vehicle. Second, flashlights are mobile and often small and they can easily be misplaced within the interior of the vehicle.

Various attempts have been made to integrate flashlights into the vehicle so that they are stored and readily available from a single location within the vehicle. For example, U.S. Pat. No. 4,819,134 issued to Rossi discloses an interior compartment light that is detachable from its housing and can be used as a flashlight, which eliminates the need for a consumer to carry a separate, ordinary flashlight within the vehicle. Other combination dome/flashlights are disclosed in U.S. Pat. No. 5,077,643 to Leach, U.S. Pat. No. 5,984,495 to Roberts, and U.S. Pat. No. 6,022,131 to Morimoto. Apart from dome lamps, flashlights have been integrated into the vehicle in other ways. For example, U.S. Pat. No. 5,645,340 issued to Colton discloses a flashlight replacement for a vehicle ashtray. The ashtray is removed and replaced by the flashlight, which can have an electrical contact for charging of the flashlight batteries when the flashlight is stored in the ashtray opening.

One problem with these prior art combination dome/flashlights is that automobile manufacturers normally want to offer consumers both high and low end vehicle options, and these combination devices are typically classified as a higher end feature for which there may be no lower end option for the vehicle. Thus, the manufacturer may feel that he has to make a decision at the design stage to either equip all of the vehicles of a particular make with the combination device, or none at all and just use a conventional type cargo lamp. Because of the additional cost that these combination devices usually add to the vehicle, it can be safer to stay with a conventional cargo lamp for lower cost than it is to impose a higher cost combination device on everyone, especially when only some consumers will want, or be willing to pay for, the more expensive combination device. As a result, manufacturers may elect not to equip the vehicles with these devices at all. Furthermore, even where the manufacturer does decide to provide the consumer with an option between a conventional cargo lamp and a combination flashlight/cargo lamp, installation into the vehicle of one or the other may have to be made by the manufacturer at the time of assembly of the vehicle. This can be problematic for dealers who typically order a certain quantity of stock and must make guesses as to which combinations of pre-configured options will be desired by its customers.

In the case of the device disclosed in the Colton patent, the flashlight and ashtray are interchangeable, thereby giving the consumer a choice between different options for use of the ashtray compartment space. However, this arrangement also has a drawback in that the flashlight eliminates the replaced device's (i.e., the ashtray's) function since there is no ashtray built into the flashlight. And a consumer may prefer to have both a flashlight and ashtray in the vehicle.

SUMMARY OF THE INVENTION

It is therefore an object of the present invention to overcome the above-noted drawbacks of the prior art by providing an interchangeable flashlight-cargo lamp system that includes both a dedicated cargo lamp and a combination flashlight/cargo lamp with these two devices being interchangeable based upon the consumer's choice. It is a further object of the present invention to provide an interchangeable flashlight-cargo lamp system in which the flashlight does not eliminate the replaced device's function, but merely adds a second function to the device.

In accordance with the invention, there is provided a vehicle cargo lamp system including a docking station, a cargo lamp, and a combination flashlight/cargo lamp (which is also referred to herein as simply a flashlight). The cargo lamp and the flashlight are both light source devices that perform a common lighting function when installed in the docking station. However, the combination flashlight/cargo lamp can be separately used as a portable flashlight when detached from the docking station and, for this purpose, it includes a power storage device such as a battery that is recharged whenever the flashlight is docked. The docking station itself includes one or more mounting features for receipt of either the cargo lamp or the flashlight. The cargo lamp and the flashlight each include a housing having common mounting elements that mate with the mounting features of the docking station. The commonality of mounting elements of the housings allow these devices to be interchangeably mounted within the same docking station. This enables a single docking station design for a vehicle to accept either device, which not only enables the manufacturer and its dealers to offer different options to the consumer, but also allows this decision to be made after completed assembly of the vehicle by the manufacturer and allows a simple means of changing between the devices in the event the vehicle owner later decides that he or she wants the other option.

A complete understanding of this invention may be obtained from the detailed description that follows taken with the accompanying drawings.

BRIEF DESCRIPTION OF THE DRAWINGS

FIG. 4 is a perspective view of an embodiment of the flashlight/cargo lamp used in the present invention; and FIG. 5 is a cross-sectional view taken along the 5-5 line of FIG. 4.

DETAILED DESCRIPTION OF THE PREFERRED EMBODIMENT

Figure 1:
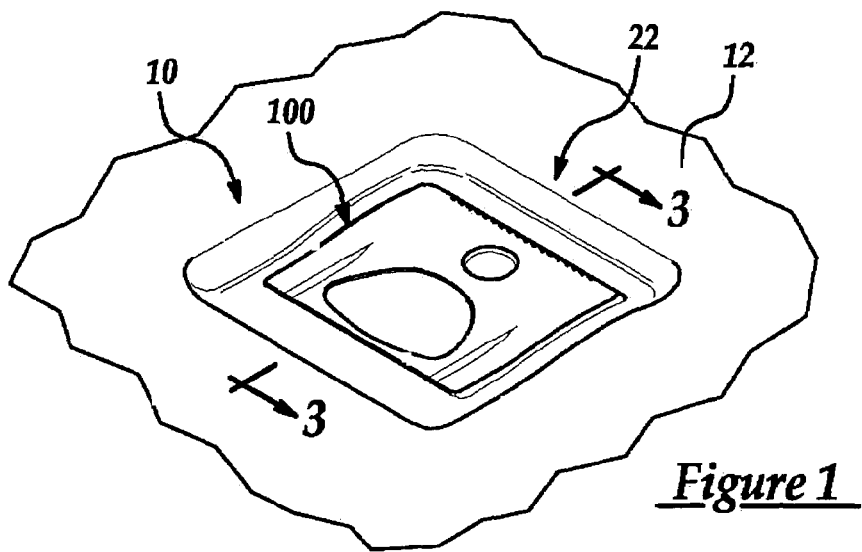
FIG. 1 is a perspective view of an embodiment of the flashlight-cargo lamp system of the present invention showing a vehicle headliner, docking station, and a cargo lamp to be mounted therein.
Figure 2:
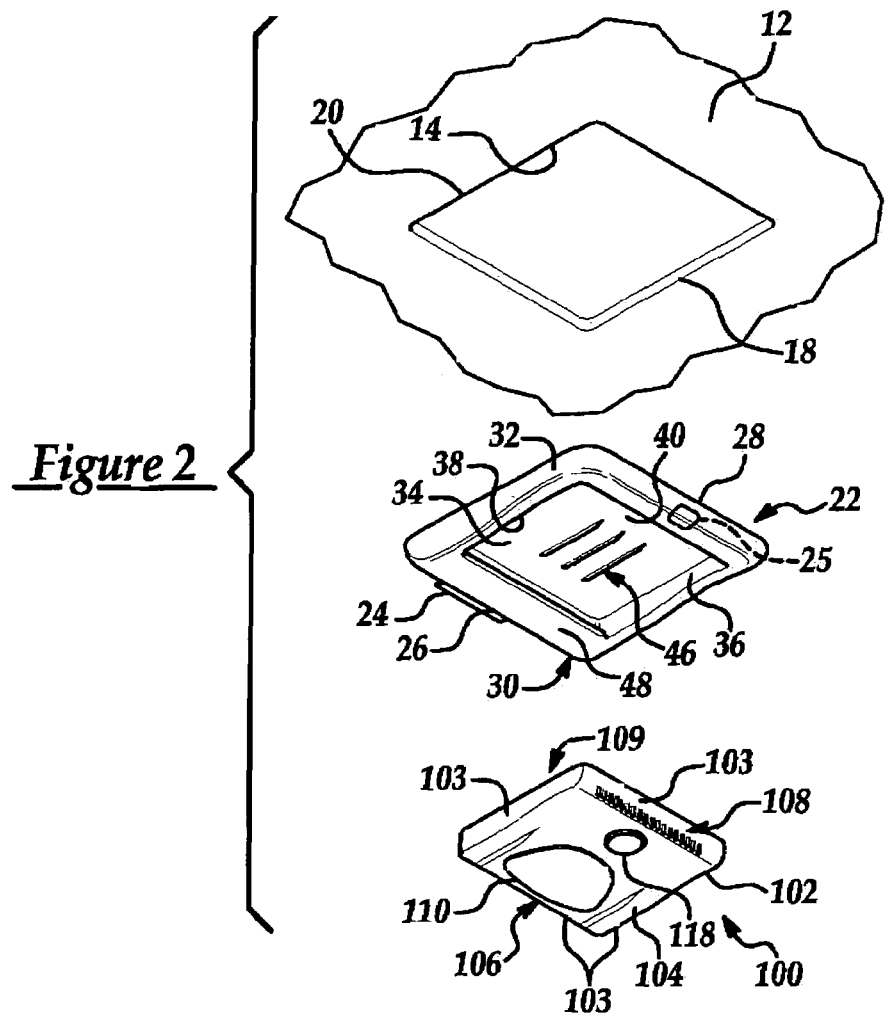
FIG. 2 is an exploded, perspective view of the flashlight-cargo lamp system of FIG. 1.
Figure 3:
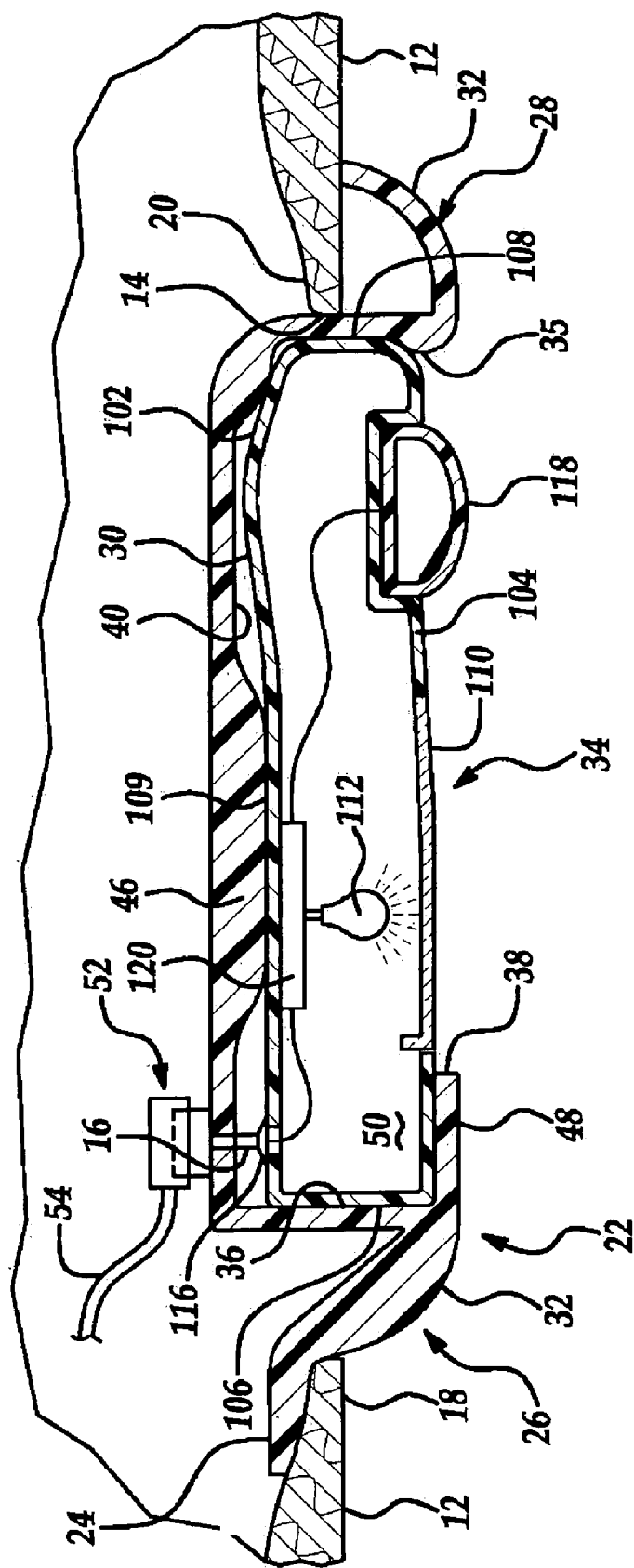
FIG. 3 is a cross-sectional view taken along with 3-3 line of FIG. 1.

An assembled interchangeable flashlight-cargo lamp system 10 of the present invention is shown in FIG. 1. The lamp system 10 is designed for mounting in an opening 14 in a vehicle headliner 12 and, in general, the lamp system includes a docking station 22 and a light source which can be either a cargo lamp 100 (as shown in FIGS. 1, 2, and 3) or a flashlight/cargo lamp 200 (as shown in FIGS. 3 and 4). These light sources are designed to be interchangeable with the docking station 22, at the consumer's option, while maintaining a common dome lighting function for the interior passenger compartment of the vehicle.

In reference to the exploded view of the flashlight-cargo lamp system 10 in FIG. 2, the opening 14 in the headliner 12 is rectangular and extends from a first end 18 to a second end 20. The docking station 22 is attached to the headliner 12 via a mounting element 24 that is formed in a first end 26 of the docking station 22. The mounting element 24 is shown in FIG. 2 as a tab that can be slidably engaged by the backside of headliner 12 adjacent the opening 14. Other suitable mounting elements, however, may be used in addition to or in lieu of tab 24.

As shown in FIG. 3, the docking station 22 includes a housing 30 having an outer bezel 32 surrounding a central recessed portion 34. The tab 24 is formed as a small extension of the bezel 32 at the first end 26. The docking station 22 is mounted inside the headliner opening 14 by inserting the tab 24 into the opening 14 such that it engages the backside of headliner 12, and then the docking station is press-fit or even snapped into the opening 14 until the bezel 32 seats on the headliner at its opposite end 20. For this purpose, the headliner opening 14 includes sides that are sized and shaped in conformance with the recessed portion 34 of the docking station housing 30, so that the docking station 22 can be mounted within the opening 14 in a tight and secure fit. The housing 30 can include one or more protrusions on its outer surface at its second end 28 underneath the bezel 32. These protrusions would help lock the docking station 22 into the opening 14. Alternatively, a retainer clip attached within the headliner could be used to engage the housing 30 and lock the docking station in place. Other such variations will become apparent to those skilled in the art.

With continued reference to both FIGS. 2 and 3, the recessed portion 34 of the docking station 22 is accessed via an opening 38 in the housing 30 and is defined by four side walls 36 and a bottom 40. The side wall 36 that is located at the first end 26 is recessed laterally away from the access opening 38 underneath a lip 48, thereby defining a first mounting feature 50. The lip 48 is an inward extension of the bezel 32 that covers a small portion of the central recess 34. As will be described below, both the cargo lamp 100 and the combination flashlight/cargo lamp 200 are sized to snap fit within recess 34, with the lip 48 and cavity 50 being used to retain at least in part the inserted device 100, 200. Cargo lamp 100 is attached to the docking station 22 by inserting a first end 106 of the cargo lamp 100 into the cavity 50 underneath the lip 48. An opposite mounting end 108 of the cargo lamp 100 is then snapped into the second end 28 of the housing recess 34. A small lip 35 on the housing 30 at the second end 28 acts as a locking feature that is used to help retain the cargo lamp 100 in place. Alternatively, the cargo lamp can be held in place by sizing it relative to the dimensions of recess 34 that it provides a tight friction fit within the recess when installed. Other means of locking or latching the cargo lamp 100 into the recess 34 will be apparent to those skilled in the art. For a more secure fit of the cargo lamp 100 in the main recess 34, the bottom 40 of the recess 34 may include ribs 46 that engage a bottom surface 109 of the cargo lamp 100 and prevent any vertical play in the cargo lamp relative to housing 30. Mounting of the flashlight 200 is handled similarly as will be discussed below.

The present invention allows the vehicle owner to remove and replace either the cargo lamp 100 or the flashlight 200 with the other as an aftermarket choice. Thus, the lamp system 10 includes a means for releasing both of these devices when they are mounted within the docking station 22. As will be discussed further in conjunction with FIGS. 4 and 5, the flashlight 200 includes a handle 201 that operates as a release means, which the user can grab and pull in order to remove the flashlight 200 from the docking station 22. Since the cargo lamp 100 may not include a handle, an optional separate release mechanism 25 may be installed within the docking station 22 for easy removal of the mounting cargo lamp 100. This is shown in FIG. 2. This release mechanism 25 can be used to partially eject the cargo lamp 100 from the docking station using any of a number of known lever or spring loaded design approaches. The release mechanism 25 can also be used for the flashlight 200.

In reference again to FIGS. 1-3, the cargo lamp 100 can be an incandescent cargo lamp that includes a rectangular housing 102 having four sides 103, a top portion 104 and a bottom portion 109. The lengths of the sides 103 are just slightly smaller, but substantially the same, as that of their respective sides 36, 38 of the recess 34 so that the cargo lamp 100 can fit securely inside. The bottom surface 109 of the cargo lamp 100 may also include additional mounting elements (not shown) that connect with the ribs 46 at the bottom surface 40 of the docking station 22.

Mounted in the top portion 104 of the housing 102 is a transparent lens 110 for transmitting light produced from a light source 112, such as a light bulb. LEDs or other sources can be used in lieu of an incandescent lamp. The light source 112 is situated just below the lens 110 at the bottom portion 109 of the housing 102. The light source 112 is connected to electrical contacts box 116 that are attached to the housing 102. The electrical contacts 116 mate with electrical contacts 16 connected within the docking station 22, which then communicate with a power source on the vehicle via a connector 52 and wiring 54. In the illustrated embodiment, although only one pair of electrical contacts 16, 116 are seen in the side view of FIG. 3, three such pairs exist to transmit power, ground, and a switched power that is activated when the vehicle doors are open. The cargo lamp 100 includes a switch 118 and an electrical circuit 120 that connects to the bulb 112, contacts 116, and switch 118. Any of a number of known circuits can be used for circuit 120 in order to provide the desired lighting functions.

In place of the incandescent cargo lamp 100, the vehicle owner may select the flashlight 200 either as original equipment or as an aftermarket purchase. As shown in FIGS. 4 and 5, the flashlight 200 includes a two-piece housing 202 having sides 203 that are sized and shaped identically to the sides 103 of the housing 102 of the cargo lamp 100, a bottom portion 209 and a top portion 204. As previously discussed for the cargo lamp 100, the lengths of the sides 203 are just slightly smaller, but substantially the same, as that of their respective sides 36 of the docking station's recess 34. This allows the flashlight 200 to fit securely inside the docking station 22 in the same manner as cargo lamp 100. The bottom and top portions 209, 204 of the flashlight 200 are, again, identical to that of the cargo lamp 100, except for a gap 205 which forms the handle portion 201 of the flashlight 200.

Internally, the flashlight 200 includes a similar design as that of the cargo lamp 100 so that the flashlight 200 can operate as a typical incandescent cargo lamp when installed in the docking station 22. The top portion 204 of the housing 202 includes a transparent lens 210 for transmitting light produced from a light source 212. The light source 212 is situated just below the lens 210 at the bottom portion 209 of the housing 202. The light source 212 is connected to electrical contacts 216 via an electrical circuit 220. The electrical contacts 216 cooperate with the electrical contacts 16 of the docking station 22 in the same manner as discussed above in connection with the cargo lamp 100. The flashlight 200 may also include a switch 218 that enables activation of the light source 212. The switch 218 allows the vehicle operator to turn the light on and off as desired. In the illustrated embodiment, the switch 218 is activated by pressing on the lens 210 which deflects downwardly and activates the switch. Such an arrangement could also be used for cargo lamp 100 in lieu of the independent switch 118.

The flashlight/cargo lamp 200 is also designed to include a mobile lighting function (i.e., a flashlight function), in addition to the dome lamp function, in the event that the user wishes to remove the flashlight 200 from the docking station 22. When being used in the flashlight function, the light produced from light source 212 still emanates through the lens 210 installed in the top portion 204 of the housing 202, which is in the same direction as when the flashlight is being used in its dome lamp function (i.e., when mounted within the docking station 22).

As shown in FIG. 5, the flashlight 200 is inserted into the docking station 22 in the same manner as the cargo lamp 100. A first end 206 of the flashlight 200 is inserted into the recess 50 of the docking station 22. Then, the handle 201, which is at a mounting end 208 of the flashlight 200, is snapped past the protrusion 35 of the docking station 22. As shown in FIG. 4, the ribs 46 that protrude from the bottom surface 40 of the docking station 22 are used to support the flashlight 200 in the same manner as discussed above in connection with cargo lamp 100.

To keep the flashlight 200 ready for use as a mobile light source at all times, the handle 201 of the flashlight 200 houses one or more rechargeable batteries 222. These batteries supply power to the bulb 212 via switch 218 when the flashlight is being used as a removable light source. When the flashlight is mounted in the docking station 22, the rechargeable batteries 222 are recharged and maintained in a charged state by the electrical circuit using power received via the electrical contacts 216. Suitable circuits for providing the battery-powered operation of the bulb, as well as for recharging of the battery 222 is well known to those skilled in the art. Thus, when the flashlight 200 is mounted within the docking station 22, the batteries are regularly subjected to electrical current for recharging and are, thus, ready for use the next time the flashlight/cargo lamp 200 is needed as a flashlight.

Since the external mounting design and the internal electrical design of the flashlight 200 are substantially similar to that of the cargo lamp 100, a vehicle owner can readily choose which one to install in his vehicle. First, the mounting features of the docking station 22, i.e., the lip 48 and the opposing protrusion 35, in conjunction with the common mounting elements of the two devices 100, 200 enable interchangeability of the devices at any time. Second, the two devices include common electrical connection elements in the form of the contacts 116, 216 which allow either to connect to complementary electrical terminals 16 in the docking station 22. Third, the provision of a rechargeable flashlight option 200 in place of the cargo lamp 100 is accomplished without loss of the cargo interior lighting function. A second function is simply added when the flashlight/cargo lamp 200 is selected.

In the illustrated embodiment, the common mounting elements shared by the cargo lamp 100 and flashlight 200 comprise similarly shaped and spaced opposite ends (106, 108 and 206, 208) of the devices. Of course, other common mounting elements can be used depending upon the complementary mounting feature utilized in the docking station. This includes, for example, a latch that could be used on the docking station with the common mounting elements of the two devices 100, 200 being a notch in the device that the latch engages to hold the device in place. Other such variations will be known to those skilled in the art.

It will thus be apparent that there has been provided in accordance with the present invention vehicle flashlight-cargo lamp system which achieves the aims and advantages specified herein. It will, of course, be understood that the foregoing description is of preferred exemplary embodiments of the invention and that the invention is not limited to the specific embodiments shown. Various changes and modifications will become apparent to those skilled in the art and all such changes and modifications are intended to be within the scope of the present invention.

We claim:

1. A method for easily upgrading and downgrading lighting features in the passenger compartment of a motor vehicle, said method comprising the steps of:
   providing a vehicle having an on-board electrical system;
   providing a universal docking station for a variety of different interior lighting modules;
   associating the docking station with the vehicle electrical system so that a lighting module docked in the docking station is operatively connected to the vehicle electrical system;
   providing a battery-powered first interior lighting module including a light source, electrical contacts, and a rechargeable battery;
   electrically interconnecting the contacts, the rechargeable battery and the light source of the first interior lighting module for energizing the light source directly from the rechargeable battery when not docked in the docking station;
   providing a battery-less second interior lighting module including a light source and electrical contacts;
   electrically interconnecting the contacts and the light source of the second interior lighting module for energizing the light source exclusively from the vehicle electrical system;
   docking one of the first and second interior lighting modules in the docking station with the electrical contacts of the module automatically making an operative electrical connection with the vehicle on-board electrical system;
   removing the docked one of the first and second interior lighting modules from the docking station and thereby automatically disconnecting its electrical contacts from the vehicle on-board electrical system; and docking the other of the first and second interior lighting modules with the electrical contacts of the newly docked one of the first and second interior lighting modules automatically making an operative electrical connection with the vehicle on-board electrical system, whereby an unskilled person can easily replace a more expensive battery-powered first interior lighting module with a less expensive battery-less second interior lighting module and vise-versa.

* * * * *